Patented Aug. 17, 1948

2,447,412

UNITED STATES PATENT OFFICE 2,447,412

PROCESS OF TREATING ARTIFICIAL MAGNESIUM HYDRATE TO PRODUCE MAGNESIA

Russell Pearce Heuer, Villa Nova, Pa., assignor to General Refractories Company, a corporation of Pennsylvania No Drawing. Application September 20, 1941, Serial No. 411,695

19 Claims. (Cl. 25—156)

The present invention relates to the production of improved dead burned magnesia or periclase from artificial magnesium hydrate, to the improved dead burned magnesia itself, and to improved refractories produced from this material.

My applications Serial Nos. 642,456 and 642,457, filed January 21, 1946, for Refractory process, relate to continuations in part hereof. My application Serial No. 642,459, filed January 21, 1946, for Refractory process, includes the stiff mud species. My application Serial No. 538,682, filed June 3, 1944, for Process of treating magnesia and products therefrom, relates to a species of clay-like material hereunder.

A purpose of the invention is to decrease the porosity and increase the density of dead burned magnesia obtained by calcining artificial magnesium hydrate, and preferably intended as a starting material for the manufacture of refractories, thereby obtaining a refractory mass of desirable volume stability, i. e., a material free from objectionable shrinkage during use at high temperature.

A further purpose is to increase the density and volume stability of calcined magnesia obtained from artificial magnesium hydrate having a magnesia content of at least 90% and preferably at least 92%, on a calcined basis, by cooperative effects of mineralizers or fluxes, and of agglomerating desirably with critically controlled moisture content.

A further purpose is to treat artificial magnesium hydrate to obtain a starting material of increased density and volume stability by mixing finely divided artificial magnesium hydrate containing at least 90% and preferably at least 92% of magnesia with sufficient finely divided lime, desirably in the form of burned lime or dolomite or calcium phosphate to make a total lime content of from 2 to 7%, preferably from 3 to 6% and most desirably about 4%, and sufficient finely divided iron oxide, desirably in the form of iron ore, chrome iron ore or mill scale, to make a total $Fe_2O_3$ content of from 2 to 10%, preferably from 2 to 6% and most desirably about 3% and preferably without substantial additions of silica, then agglomerating the moist mixture under a pressure exceeding 500 pounds per square inch, next calcining the agglomerated material at a temperature of between 1300 and 1500° C., although less desirably temperatures as high as 1600° C. may be used, and finally comminuting the calcine.

A further purpose is to regulate the moisture content when agglomerating, after adding any suitable mineralizers or fluxes, preferably those specified herein, so that a moisture content of between 20 and 35% is used for an agglomerating pressure of between 500 and 1500 pounds per square inch, and a moisture content of between 15 and 35% is used for a pressure in excess of 1500 pounds per square inch, the agglomerating pressure in any case being in excess of 500 pounds per square inch.

A further purpose is to agglomerate artificial magnesium hydrate mixed with mineralizers or fluxes, preferably the materials in the proportions herein specified, under a pressure in excess of 500 pounds per square inch and desirably under a pressure in excess of 1500 pounds per square inch, using in excess of 23% of moisture for a pressure of between 500 and 1500 pounds per square inch, in excess of 18% of moisture for a pressure of between 1500 and 2000 pounds per square inch and in excess of 15% for a pressure of 2000 pounds per square inch or greater, the moisture content in all cases being less than 35%.

A further purpose is to agglomerate artificial magnesium hydrate with mineralizers or fluxes, under a pressure exceeding 1500 pounds per square inch and with a moisture content of between 24 and 30%.

A further purpose is to agglomerate a mixture of artificial magnesium hydrate with mineralizers or fluxes, using a pressure in excess of 500 pounds per square inch and a moisture content which will just squeeze from a vented mold during agglomerating.

A further purpose is to produce a self bonded refractory comprising calcined artificial magnesia which has a magnesia content in excess of 85%, composed of a calcined mixture of artificial magnesium hydrate, about 4% of total lime and about 3% of total iron oxide, substantially free from added silica, the magnesia granules having a bulk specific gravity in excess of 3.10.

A further purpose is to increase the crushing strength of agglomerated magnesia masses to avoid a loss of bond during the calcining operation at intermediate temperature such as 1200°

C., by incorporating small percentages of kaolin in the magnesium hydrate from which the dead burned magnesite is to be made prior to calcining, the quantities of kaolin preferably being from 1 to 3%. Instead of kaolin, pyrophyllite may be used preferably in the proportions of 1 to 4%.

Further purposes appear in the specification and in the claims.

In the past the bulk of magnesia used in the form of dead burned magnesite or periclase as a starting material for the manufacture of refractories has come from natural sources, such as the deposits in Germany and Manchuria. Due to the high transportation costs, the difficulty in obtaining natural magnesite and the existence of certain unsatisfactory properties in the natural product, artificial magnesia is now being produced by a number of processes. The principal commercial processes for producing artificial dead burned magnesia rely on the production of magnesium hydrate and calcining the magnesium hydrate, as distinguished from the usual prior art process which involved calcining natural magnesium carbonate.

One of the processes of producing magnesium hydrate involves the treatment of sea water or brine of any character containing magnesium salts, with burned lime or burned dolomitic lime. Another process for recovering magnesium hydrate involves leeching calcined dolomitic lime with water or an aqueous solution. In another process calcined dolomite is treated with an ammonium salt. There are numerous other processes which have not however yet become commercial.

The product produced by the processes of the character above referred to is of very high quality chemically but, for reasons not heretofore generally understood, has not proved to be satisfactory in refractory manufacture and related industries. The artificial magnesium hydrate as usually obtained is a fine precipitate or slurry containing on a calcined basis more than 90% and in most cases more than 92% MgO, about 1% of lime and sometimes nearly 2%, up to about 1.5% of $Fe_2O_3$, up to about 1.5% of silica, up to about 1% of alumina and possibly traces of other impurities.

Typical analyses of two artificial magnesium hydrates on a calcined basis are as follows:

| | Per cent | Per cent |
|---|---|---|
| CaO | 1.93 | 1.30 |
| $Fe_2O_3$ | 1.30 | 0.30 |
| $SiO_2$ | 0.80 | 0.50 |
| $Al_2O_3$ | 0.82 | 0.20 |
| S | 0.90 | |
| MgO | 94.25 | 97.30 |
| | 100.00 | 99.70 |

The second of these materials, as is, in the form of dry artificial magnesium hydrate has the following typical composition:

| | Per cent |
|---|---|
| Loss on ignition | 31.4 |
| CaO | 0.89 |
| $Fe_2O_3$ | 0.21 |
| $SiO_2$ | 0.41 |
| $Al_2O_3$ | 0.14 |
| MgO | 66.95 |
| | 100.00 |

When this material is calcined, the resultant calcine is of comparatively low density and poor volume stability notwithstanding that extraordinary precautions have been taken to obtain a material of high density and high volume stability. The usual present practice is to calcine at very high temperatures (1600° C. or higher) in an attempt to increase the density and volume stability, but in spite of this expensive step the final product is about 10% lower in density than the calcine obtained from Manchurian magnesite deposits at much lower temperatures to produce a calcine of very similar chemical composition.

The present inventor has investigated the reasons for the inferior qualities of the product obtained by calcining artificial magnesium hydrate, and has discovered that by adding selected agents to the raw material desirably in certain specified proportions, and by agglomerating the material at predetermined pressures prior to calcining, preferably using a controlled moisture content, the above difficulties can be overcome and a refractory starting material obtained having a bulk specific gravity in excess of 3.10 and often in excess of 3.20, or even 3.30, and having a correspondingly high volume stability and freedom from shrinkage during use. This latter specific gravity is higher than that obtained by calcining the natural Manchurian magnesite.

It had previously been considered that the increased purity of artificial dead burned magnesia would result in obtaining a product of increased density. This is not in fact the case. When preparing dead burned magnesite from magnesium hydrate the experiments of the present inventor indicate that the addition of a source of finely divided lime and a source of finely divided iron oxide to artificial magnesium hydrate prior to calcining aids in producing a calcine of increased density and higher volume stability. As a source of lime, burned lime, burned dolomitic lime, slaked lime, slaked dolomitic lime, limestone, dolomite, or commercial calcium phosphate such as tricalcium phosphate or apatite may be employed. The quantity of lime which is added should be sufficient to make the total lime content between 2 and 7% preferably between 3 and 6%. For best results the total CaO content should be approximately 4%.

Higher total lime contents than 7% are likely to cause difficulty through slaking. The product containing about 4% of total lime has excellent moisture resistance.

A satisfactory form of lime is dry slaked lime which, as is, has the following typical analysis:

| | Per cent |
|---|---|
| Loss on ignition | 22.85 |
| $SiO_2$ | 3.80 |
| CaO | 63.76 |
| MgO | 7.29 |
| $R_2O_3$ (chiefly $Al_2O_3$) | 1.80 |
| | 99.50 |

Tricalcium phosphate, suitably in the form of finely divided phosphate rock or apatite, will function as a source of lime equally effective with burned lime on the basis of the same CaO content, as if the formula of tricalcium phosphate were $3CaO \cdot P_2O_5$. The use of tricalcium phosphate counteracts to a considerable extent any tendency of the lime to slake, while making no substantial difference from the standpoint of obtaining a calcine of increased density and volume stability.

Iron oxide or a source of iron oxide is added in addition to the lime. The quantity of added iron oxide in terms of $Fe_2O_3$ should be sufficient to build up the total $Fe_2O_3$ content to from 2 to 10% preferably from 2 to 6% and most desirably about 3%.

Any suitable source of iron oxide may be employed, such as iron ore, hematite, chrome iron ore or mill scale. The addition of chrome iron ore is particularly useful where a chrome magnesite or magnesite chrome brick is to be made.

The best point at which to introduce the sources of lime and iron oxide is to the sludge or slurry of magnesium hydrate, thus obtaining thorough admixture with the magnesium hydrate while it is still wet. The lime and iron oxide should be sufficiently finely divided to mix well with the magnesium hydrate. Particle sizes of below 60 Tyler standard mesh per linear inch are desirable, and preferably below one hundred mesh.

In order to increase the strength of the agglomerated magnesite masses during the calcining operation, for example, the strength at about 1200° C., it is desirable to incorporate small percentages of kaolin or of pyrophyllite in the magnesium hydrate prior to calcining. The kaolin or pyrophyllite has no disadvantageous effect on the density or volume stability of the calcine, and it greatly enhances the intermediate temperature strength of the dead burned magnesite. An incidental advantage of the use of kaolin or pyrophyllite is that it aids in making a strong briquet for the purpose of calcining of the magnesium hydrate.

The quantity of kaolin will desirably be of the order of 1 to 3% of the dry mix. Where pyrophyllite is used, the quantity will be desirably from 1 to 4% of the dry mix. Pyrophyllite may to advantage be used with kaolin, and the quantity of pyrophyllite and kaolin combined may range from 1 to 7%.

The introduction of kaolin and/or pyrophyllite into artificial magnesium hydrate prior to calcining is desirable whether or not mineralizers or fluxes are being used, and whether or not the mixture is to be agglomerated, with or without moisture control, prior to calcining. The most advantageous use of kaolin and/or pyrophyllite is made, however, when 2 to 7% of total lime and 1 to 10% of total iron oxide are present, and agglomeration as well as moisture control are being employed.

After the admixture of the sources of lime and iron oxide and/or the kaolin and/or the pyrophyllite with the artificial magnesium hydrate, and suitable treatment to obtain uniform distribution throughout, the slurry will preferably be filtered and the filter cake will be agglomerated prior to calcining. Briqueting of the magnesium hydrate has been found to markedly increase the ultimate density and volume stability of the product.

The experiments of the present inventor indicate that agglomerating is not useful in the present invention unless a pressure of at least 500 pounds per square inch is used. The usual type of "briqueting," at two or three hundred pounds per square inch, is not of advantage. Increase in agglomerating pressure above 3000 pounds per square inch does not yield a corresponding increase in the density and volume stability of the dead burned magnesite. Pressures as high as 10,000 pounds per square inch may be used but it is not particularly efficient to employ pressure in excess of 1500 to 3000 pounds per square inch.

While some advantage may be obtained in agglomerating without control of moisture content, moisture control results in marked improvement in density and volume stability. In general, too low or too high moisture content will result in producing a calcine of low density. The higher the pressure above 500 pounds per square inch, the lower the permissible moisture content. Moisture contents as low as those normally used in brick manufacture, such as 5%, are not permissible, however.

In general, depending upon the pressure, the moisture content should be within the range of 15 to 35%. The range from 30 to 35% is not recommended, but will be permissible in any vented brick mold or slightly worn brick mold, since this slight excess of moisture can be squeezed out during pressing without harm.

For a pressure range between 500 and 1500 pounds per square inch, the moisture content should range between 20 and 35%, preferably between 23 and 35% and most desirably between 24 and 30%. For pressures of 1500 pounds per square inch and above, the moisture content should be between 15 and 35%. Preferably for pressures between 1500 and 2000 pounds per square inch, the moisture content should range between 18 and 35%, and most desirably it should be between 24 and 30%. Preferably for pressures of 2000 pounds per square inch and greater, the moisture content should range between 15 and 35%, most desirably being between 24 and 30%. In all cases for very best results the moisture content should be that at which moisture just begins to squeeze out of a vented or slightly worn mold during pressing.

To illustrate the effect of moisture content on a calcined magnesia obtained from artificial magnesium hydrate mixed with lime and iron oxide as explained above, bulk specific gravity of a particular calcine may be plotted against moisture content of the mix before pressing for pressures ranging from 1500 pounds per square inch in one curve to 3000 pounds per square inch in another curve. At 1500 pounds per square inch the bulk specific gravity rises rapidly with moisture content up to 29%, and above 29% any slight excess of moisture squeezes from the mold. In the case of higher pressures, the permissible moisture content for a given bulk specific gravity may be lower than with 1500 pounds per square inch, and the rise in bulk specific gravity with rise in moisture content is less pronounced. It is always best to operate at a point close to that at which any slight excess of moisture squeezes from the mold.

The relation of bulk specific gravity to pressure may be plotted for an average of all compositions agglomerated with a moisture content which will just being to squeeze out of the mold, and with a calcining temperature ranging from 1300 to 1600° C. in the various samples. In all cases the average bulk specific gravity is equal to or better than that of calcined Manchurian magnesite, and the bulk specific gravity shows very slight increase for increase in pressure above 1500 pounds per square inch, as we would expect from plotting bulk specific gravity against moisture content as above mentioned.

The filter cake consisting of a mixture of artifiical magnesium hydrate, lime and iron oxide, is preferably dried at about 200° C. before moistening, so that an accurately measured quantity of water can be added to moisten and temper the mix. Instead of water an aqueous solution of magnesium salt or moist magnesium hydrate of known water content may be added to moisten the mix.

It has been found that the dry press process is most desirable for agglomerating, although the stiff mud process may be used if equipment can be obtained capable of developing adequately high pressures.

Subsequent to agglomerating, the briquet will be dried, preferably at a temperature of about 200° C. to remove mechanically held water.

The suitably dried briquets will be calcined in any suitable kiln or calcining furnace capable of developing the desired calcining temperature of about 1400° C. The calcining temperature may be as low as 1300° C., although this low temperature is not recommended for most commercial purposes. It is not necessary nor desirable in the present invention to employ the abnormally high temperature exceeding 1600° C. which have been used in the prior art in an effort to obtain a dense dead burned magnesia from magnesium hydrate, although such high temperatures could be used. In particular cases it may be desirable to go as high as 1400° C. or even to 1500° C. for special purposes, although one of the advantages of the present invention is that a much denser dead burned magnesite can be obtained by calcining at 1400° C. than was obtainable from magnesium hydrate in the prior art by calcining at 1650° C.

It is not necessary to hold the briquets for any extended period of time at the maximum temperature. Periods of one hour at 1400° C. have proved quite satisfactory.

After the briquets are calcined, the briquets will be broken down or comminuted into dead burned magnesia of suitable grain size for the purpose intended. It will normally be desired to obtain a coarse grain fraction and a fine grain fraction where magnesite, magnesite chrome, and chrome magnesite refractory shapes are to be formed. The term "comminuted" will be applied to the breaking down of this material into refractory particle sizes, whether the refractory particle sizes be coarse or fine as judged by refractory size standards.

The effects obtained in the present invention are believed to be primarily physical rather than chemical. To some extent advantage will be obtained by applying the agglomeration and moisture control of the present invention to mixtures of artificial magnesium hydrate with other mineralizers and fluxes, such as lime and silica, lime and alumina, etc., but for best results substantial additions of silica should be avoided and the silica in the artificial magnesium hydrate should not exceed 1.5% and preferably be below 1%. The effect of the agglomeration and the moisture control is most pronounced however when applied to a mix containing 2 to 7% of total lime and 1 to 10% of total iron oxide.

The comminuted calcine or clinker contains at least 85% of MgO and often more than 90%. A typical analysis as as follows:

| | Per cent |
|---|---|
| Loss on ignition | 0.00 |
| CaO | 4.00 |
| Fe₂O₃ | 3.14 |
| SiO₂ | 0.90 |
| Al₂O₃ | 0.39 |
| MgO | 91.55 |
| | 99.98 |

The effect of variation in the content of lime, iron oxide and moisture, when agglomerating under a pressure of 1500 pounds per square inch and calcining at 1400° C. for one hour is shown by the following examples:

| MgO Raw Material | Dry Slaked CaO Added | Fe₂O₃ Added | Moisture | Bulk Specific Gravity |
|---|---|---|---|---|
| Per cent | Per cent | Per cent | Per cent | |
| 97.78 | 0.88 | 1.34 | 26.84 | 2.77 |
| 95.31 | 3.35 | 1.33 | 26.21 | 3.13 |
| 92.84 | 5.82 | 1.33 | 26.11 | 3.13 |
| 96.16 | 0.92 | 2.92 | 28.15 | 2.92 |
| 93.68 | 3.41 | 2.91 | 26.59 | 3.16 |
| 91.22 | 5.88 | 2.90 | 25.16 | 3.17 |
| 94.52 | 0.96 | 4.52 | 26.88 | 2.98 |
| 92.04 | 3.46 | 4.50 | 24.29 | 3.21 |
| 89.58 | 5.93 | 4.49 | 25.17 | 3.22 |
| 92.87 | 1.00 | 6.13 | 25.49 | 3.01 |
| 90.39 | 3.50 | 6.11 | 25.04 | 3.26 |
| 89.87 | 3.90 | 6.22 | 25.54 | 3.27 |
| 94.95 | 3.07 | 1.98 | 27.00 | 3.29 |
| 96.00 | 2.00 | 2.00 | 27.00 | 3.29 |

The ultimate compositions of the calcines produced in the above examples were as follows:

| MgO | CaO | Fe₂O₃ | SiO₂ | Al₂O₃ |
|---|---|---|---|---|
| Per cent | Per cent | Per cent | Per cent | Per cent |
| 94.80 | 2.08 | 2.23 | 0.66 | 0.23 |
| 92.29 | 4.31 | 2.21 | 0.87 | 0.32 |
| 89.80 | 6.51 | 2.18 | 1.08 | 0.43 |
| 92.55 | 2.08 | 4.49 | 0.65 | 0.23 |
| 90.06 | 4.31 | 4.44 | 0.86 | 0.33 |
| 87.61 | 6.49 | 4.40 | 1.07 | 0.43 |
| 90.32 | 2.08 | 6.74 | 0.64 | 0.22 |
| 87.86 | 4.30 | 6.67 | 0.85 | 0.32 |
| 85.46 | 6.47 | 6.60 | 1.05 | 0.42 |
| 87.79 | 2.07 | 8.94 | 1.00 | 0.22 |
| 85.63 | 4.32 | 8.88 | 0.85 | 0.32 |
| 85.15 | 4.63 | 9.02 | 0.87 | 0.33 |
| 91.55 | 4.02 | 3.14 | 0.90 | 0.39 |
| 92.70 | 3.09 | 3.18 | 0.68 | 0.24 |

In terms of added lime, it has been found that for a total lime content of 2 to 7% in the above illustration the lime addition should be about 0.5 to 6%, for a total lime content of 3 to 6%, the lime addition should be about 2 to 5%, and for a total lime content of 4% the lime addition should be 2–3%. In terms of iron oxide, for a total iron oxide content of 2 to 10% the iron oxide addition should be about 1 to 8%, for a total iron oxide content of 2 to 6% the iron oxide addition should be about 1 to 5%, and for a total iron oxide content of 3% the iron oxide addition should be about 2%.

An unusual feature is that the product of the present invention which is low in silica and contains about 4% of total lime and about 3% of total iron oxide is self bonding. It has been found by me that dead burned magnesia of this character can be formed into magnesite brick, chrome magnesite brick or magnesite chrome brick for use without kiln firing and without the addition of sulphuric acid, sodium acid sulphate, or an organic bond such as dextrine, sulphite paper waste, or any other bond as has heretofore been necessary. The self bonding quality of the magnesia will also bond chrome iron ore in a non-acid brick predominantly consisting of a mixture of the two. When dried at ordinary drying temperatures, for example, of the order of 200° C., such brick is of considerable cold strength, apparently due to bonding compounds developed in the magnesia by the drying treatment.

The dead burned magnesia of the present invention as obtained by comminuting the briquets will be employed as a starting material for refractory brick in the same manner in which dead burned magnesite or periclase is now used. As well as being employed in refractory bricks, it will, of course, find use as dead burned grain magnesite for the construction of basic open hearths and other furnace bottoms also in refractory cements and possibly for other purposes, as, for example, in the chemical industry.

The dead burned magnesia as obtained by the present invention has a distinct advantage over dead burned magnesia as now obtained from magnesium hydrate, because of the markedly increased density and volume stability of the material of the present invention. As compared to dead burned magnesite obtained from natural materials, the material of the present invention is higher in magnesium oxide content and also of greater density. Furthermore, the material of the present invention is subject to the control of the operator as to its impurities. The amount of iron, lime, and silica may all be regulated and adjusted to suit the wishes of the operator, and this has not been possible in the preparation of dead burned magnesite from natural magnesite. The lime additions can be prevented from excessively reducing the magnesium oxide content by incorporating the lime in the form of dolomitic lime or lime of very high magnesium oxide content.

It will be evident that in order to obtain the full benefit of the present invention, the cooperative effects due to the addition of a source of lime and the addition of a source of iron oxide should be employed in combination with the effect of agglomerating at pressures in excess of 500 pounds per square inch and with controlled moisture content.

All percentages herein are by weight on a dry or calcined basis except percentages of moisture or other cases in which the context indicates percentages on a wet basis.

In view of my invention and disclosure variations and modifications to meet individual whim or particular need will doubtless become evident to others skilled in the art, to obtain all or part of the benefits of my invention without copying the process and product shown, and I, therefore, claim all such in so far as they fall within the reasonable spirit and scope of my invention.

Having thus described my invenion what I claim as new and desire to secure by Letters Patent is:

1. The process of treating artificial magnesium hydrate to obtain a refractory starting material of increased density and volume stability, which comprises mixing finely divided artificial magnesium hydrate with finely divided lime until the total lime content is from 2 to 7%, and with added finely divided iron oxide until the total $Fe_2O_3$ content is from 2 to 10%, silica being present in amounts not over 1.5%, regulating the moisture content to a value of 15% or more, agglomerating the moist mixture under a pressure exceeding 500 pounds per square inch and calcining the agglomerated material at a temperature of between 1300 and 1600° C.

2. The process of treating artificial magnesium hydrate to obtain a refractory starting material of increased density and volume stability, which comprises mixing finely divided artificial magnesium hydrate containing at least 90% of magnesia on a calcined basis with finely divided lime until the total lime content is about 4% and added finely divided iron oxide until the total $Fe_2O_3$ content is about 3% silica being present in amounts not over 1.5%, regulating the moisture content to a value of 15% or more, agglomerating the moist mixture under a pressure exceeding 500 pounds per square inch and calcining the agglomerated material at a temperature of between 1300 and 1600° C.

3. The process of treating artificial magnesium hydrate to obtain a refractory starting material of increased density and volume stability, which comprises mixing finely divided artificial magnesium hydrate with finely divided calcium oxide in the form of calcium phosphate until the total CaO content is from 2 to 7% and with added finely divided iron oxide until the total $Fe_2O_3$ content is from 2 to 10%, silica being present in amounts not over 1.5%, regulating the moisture content to a value of 15% or more, agglomerating the moist mixture under a pressure exceeding 500 pounds per square inch and calcining the agglomerated material at a temperature of between 1300 and 1600° C.

4. The process of treating artificial magnesium hydrate to obtain a refractory starting material of increased density and volume stability, which comprises mixing finely divided artificial magnesium hydrate with finely divided lime until the total lime content is from 2 to 7% and with added finely divided iron oxide in the form of chrome iron ore until the total $Fe_2O_3$ content is from 2 to 10%, silica being present in amounts not over 1.5%, regulating the moisture content to a value of 15% or more, agglomerating the moist mixture under a pressure exceeding 500 pounds per square inch and calcining the agglomerated material at a temperature of between 1300 and 1600° C.

5. The process of treating artificial magnesium hydrate containing lime as an impurity, to obtain a refractory starting material of increased density and volume stability, which comprises adjusting the lime impurity until the total lime content is about 3 to 6% in the final calcined product, adding finely divided iron oxide sufficient to make approximately 2 to 6% in the final calcined product, silica being present in amounts not over 1.5%, regulating the moisture content with respect to the intended pressure to a value not less than 15% at which moisture will just squeeze from the mold under the intended pressure, agglomerating the moist mixture in a vented mold under a pressure exceeding 500 pounds per square inch and calcining the agglomerated material at a temperature of between 1300 and 1500° C.

6. The process of treating artificial magnesium hydrate to obtain a refractory starting material of increased density and volume stability, which comprises mixing finely divided artificial magnesium hydrate containing at least 90% of magnesia on a calcined basis with added finely divided lime until the total lime content is from 2 to 7% and with added finely divided iron oxide until the total $Fe_2O_3$ content is from 2 to 10%, silica being present in amounts not over 1.5%, regulating the moisture content with respect to the intended pressure to a value between 20 and 35% for a pressure of between 500 and 1500 pounds per square inch and to a value of between 15 and 35% for a pressure in excess of 1500 pounds per square inch, agglomerating the moist mixture under a pressure exceeding 500 pounds per square inch and corresponding to the chosen moisture content and calcining the agglomerating material at a temperature of between 1300 and 1500° C.

7. The process of treating artificial magnesium hydrate to obtain a refractory starting material of increased density and volume stability, which comprises mixing finely divided artificial magnesium hydrate containing at least 90% of magnesia on a calcined basis with finely divided lime until the total lime content is about 4% and with added finely divided iron oxide until the Fe₂O₃ content is about 3%, silica being present in amounts not over 1.5%, regulating the moisture content with respect to the intended pressure to a value between 20 and 35% for a pressure of between 500 and 1500 pounds per square inch and to a value of between 15 and 35% for a pressure in excess of 1500 pounds per square inch, agglomerating the moist mixture under a pressure exceeding 500 pounds per square inch and corresponding to the chosen moisture content and calcining the agglomerated material at a temperature of between 1300 and 1500° C.

8. The process of treating artificial magnesium hydrate to obtain a refractory starting material of increased density and volume stability, which comprises mixing finely divided artificial magnesium hydrate containing at least 90% of magnesia on a calcined basis with added finely divided lime until the total lime content is from 2 to 7% and with added finely divided iron oxide until the total Fe₂O₃ content is from 2 to 10%, silica being present in amounts not over 1.5%, regulating the moisture content with respect to the intended pressure to a value in excess of 23% for a pressure of between 500 and 1500 pounds per square inch, in excess of 18% for a pressure of between 1500 and 2000 pounds per square inch and in excess of 15% for a pressure of 2000 pounds per square inch or greater, the value being in all cases less than 35%, agglomerating the moist mixture under a pressure exceeding 500 pounds per square inch and corresponding to the chosen moisture content and calcining the agglomerated material at a temperature of between 1300 and 1500° C.

9. The process of treating artificial magnesium hydrate to obtain a refractory starting material of increased density and volume stability, which comprises mixing finely divided artificial magnesium hydrate containing at least 90% of magnesia on a calcined basis with added finely divided lime until the total lime content is about 4% and with added finely divided iron oxide, until the total Fe₂O₃ content is about 3%, silica being present in amount not over 1.5%, regulating the moisture content with respect to the intended pressure to a value in excess of 23% for a pressure of between 500 and 1500 pounds per square inch, in excess of 18% for a pressure of between 1500 and 2000 pounds per square inch and in excess of 15% for a pressure of 2000 pounds per square inch or greater, the value being in all cases less than 35%, agglomerating the moist mixture under a pressure exceeding 500 pounds per square inch and corresponding to the chosen moisture content and calcining the agglomerated material at a temperature of between 1300 and 1500° C.

10. The process of treating artificial magnesium hydrate to obtain a refractory starting material of increased density and volume stability, which comprises mixing finely divided artificial magnesium hydrate containing at least 90% of magnesia on a calcined basis with added finely divided lime until the total lime content is from 2 to 7%, with added finely divided iron oxide until the total Fe₂O₃ content is from 2 to 10%, silica being present in amounts not over 1.5%, regulating the moisture content with respect to the intended pressure to a value between 24 and 30%, agglomerating the moist material under a pressure exceeding 1500 pounds per square inch and calcining the agglomerated material at a temperature of between 1300 and 1500° C.

11. The process of treating artificial magnesium hydrate to obtain a refractory starting material of increased density and volume stability, which comprises mixing finely divided artificial magnesium hydrate containing at least 90% of magnesia on a calcined basis with added finely divided lime until the total lime content is about 4% and with added finely divided iron oxide until the total Fe₂O₃ content is about 3%, silica being present in amounts not over 1.5%, regulating the moisture content with respect to the intended pressure to a value between 24 and 30%, agglomerating the moist material under a pressure exceeding 1500 pounds per square inch and calcining the agglomerated material at a temperature of between 1300 and 1500° C.

12. The process of treating artificial magnesium hydrate to obtain a refractory starting material of increased density and volume stability, which comprises mixing finely divided artificial magnesium hydrate containing at least 90% of magnesia on a calcined basis with added finely divided lime until the total lime content is from 2 to 7%, with added finely divided iron oxide until the total Fe₂O₃ content is from 2 to 10%, silica being present in amounts not over 1.5%, regulating the moisture content with respect to the intended pressure to a value not less than 15% at which moisture will just squeeze from the mold under the intended pressure, agglomerating the moist mixture under a pressure exceeding 500 pounds per square inch while maintaining a restricted opening to the atmosphere and calcining the agglomerated material at a temperature of between 1300 and 1500° C.

13. The process of treating artificial magnesium hydrate to obtain a refractory starting material of increased density and volume stability, which comprises mixing finely divided artificial magnesium hydrate containing at least 90% of magnesia on a calcined basis with calcium oxide in the form of finely divided calcium phosphate until the total CaO content is from 2 to 7% and with added finely divided iron oxide until the total Fe₂O₃ content is from 2 to 10%, silica being present in amounts not over 1.5%, regulating the moisture content with respect to the intended pressure to a value between 20 and 35% for a pressure of between 500 and 1500 pounds per square inch and to a value of between 15 and 35% for a pressure in excess of 1500 pounds per square inch, agglomerating the moist mixture under a pressure exceeding 500 pounds per square inch and corresponding to the chosen moisture content and calcining the agglomerated material at a temperature of between 1300 and 1500° C.

14. The process of treating artificial magnesium hydrate to obtain a refractory starting material of increased density and volume stability, which comprises mixing finely divided artificial magnesium hydrate containing at least 90% of magnesia on a calcined basis with calcium oxide in the form of finely divided calcium phosphate until the total CaO content is about 4%, and with added finely divided iron oxide until the total Fe₂O₃ content is about 3%, silica being present in amounts not over 1.5%, regulating the moisture content with respect to the intended pressure to a value between 24 and 30%, agglomerating the moist material under a pressure exceeding 1500 pounds per square inch and calcining the agglomerated material at a temperature of between 1300 and 1500° C.

15. The process of making improved dead burned magnesia from artificial magnesium hydrate, which comprises mixing the artificial magnesium hydrate with from 1 to 3% of kaolin and with lime until the total lime content is from 2 to 7% and with iron oxide until the total Fe₂O₃ content is from 2 to 10%, silica being present in amounts not over 1.5%, regulating the moisture content to a value of 15% or more, agglomerating the moist mixture under a pressure exceeding 500 p. s. i. and calcining the mixture at a temperature of between 1300° C. and 1600° C.

16. The process of treating a mixture of artificial magnesium hydrate and water to obtain a refractory starting material of increased density and volume stability, which comprises partially drying the mixture until its content of water is between 15% and 35%, adjusting the lime content until the total lime content is from 2 to 7%, adjusting the iron oxide content until the total Fe₂O₃ content is from 2 to 10%, silica being present in amounts not over 1.5%, agglomerating the partially dried mixture by means of the dry press process under a pressure in excess of 500 lbs. per square inch to form a moist but suitably compacted mass, drying the mass and calcining it at a temperature between 1300° C. and 1600° C.

17. The process of treating a mixture of artificial magnesium hydrate and water to obtain a refractory starting material of increased density and volume stability, which comprises adjusting the lime content until the total lime content is from 2 to 7%, adjusting the iron oxide content until the total Fe₂O₃ content is from 2 to 10%, silica being present in amounts not over 1.5%, partially drying the mixture, regulating the moisture content of the material with respect to the intended pressure to a value between 20% and 35% for a pressure of between 500 and 1500 lbs. per square inch and to a value of between 15% and 30% for a pressure in excess of 1500 lbs. per square inch, agglomerating the moist mixture by means of the dry press process under a pressure exceeding 500 lbs. per square inch and corresponding to the chosen moisture content to form a moist but suitably compacted mass, drying the mass and calcining it at a temperature between 1300° C. and 1600° C.

18. The process of treating a mixture of artificial magnesium hydrate containing lime as impurity and water to obtain a refractory starting material of increased density and volume stability, which comprises adjusting the lime content until the total lime content is from 2 to 7%, adjusting the iron oxide content until the total Fe₂O₃ content is from 2 to 10%, silica being present in amounts not over 1.5%, partially drying the mixture, regulating the moisture content of the material with respect to the intended pressure to a value between 20% and 35% for a pressure of between 500 and 1500 lbs. per square inch and to a value of between 15% and 30% for a pressure in excess of 1500 lbs. per square inch, agglomerating the moist mixture by means of the dry press process under a pressure exceeding 500 lbs. per square inch and corresponding to the chosen moisture content to form a moist but suitably compacted mass, drying the mass and calcining it at a temperature between 1300° C. and 1600° C.

19. The process of treating a mixture of artificial magnesium hydrate containing lime as impurity and water to obtain a refractory material of increased density and volume stability, which comprises adjusting the lime impurity until the total lime content is about 3% to 6% in the final calcined product, adding finely divided iron oxide sufficient to make approximately 2% to 6% in the final calcined product, silica being present in amounts not over 1.5%, regulating the moisture content of the material with respect to the intended pressure to a value between 20% and 35% for a pressure of between 500 and 1500 lbs. per square inch and to a value of between 15% and 30% for a pressure in excess of 1500 lbs. per square inch, agglomerating the moist mixture by means of the dry press process under a pressure exceeding 500 lbs. per square inch and corresponding to the chosen moisture content to form a moist but suitably compacted mass, drying the mass and calcining it at a temperature between 1300° C. and 1600° C.

RUSSELL PEARCE HEUER.

REFERENCES CITED

The following references are of record in the file of this patent:

UNITED STATES PATENTS

| Number | Name | Date |
| --- | --- | --- |
| 232,110 | Braconnier | Sept. 14, 1880 |
| 850,723 | Beale et al. | Apr. 16, 1907 |
| 1,564,394 | Youngman | Dec. 8, 1925 |
| 1,984,759 | Patton | Dec. 18, 1934 |
| 2,033,886 | Farnsworth | Mar. 10, 1936 |
| 2,068,641 | Carrie et al. | Jan. 26, 1937 |
| 2,077,795 | Harvey et al. | Apr. 20, 1937 |
| 2,079,066 | Hartmann | May 4, 1937 |
| 2,087,107 | Heuer | July 13, 1937 |
| 2,253,620 | Heuer | Aug. 26, 1941 |
| 2,281,477 | Chesney | Apr. 28, 1942 |
| 2,313,746 | Heany | Mar. 16, 1943 |
| 2,314,107 | Shardlow | Mar. 16, 1943 |
| 2,316,228 | Erdmann | Apr. 13, 1943 |
| 2,316,229 | Berlek | Apr. 13, 1943 |
| 2,348,847 | Pike | May 16, 1944 |

FOREIGN PATENTS

| Number | Country | Date |
| --- | --- | --- |
| 21 | Great Britain | 1880 |
| 134,624 | Australia | 1933 |
| 207,172 | Great Britain | 1924 |
| 288,262 | Germany | 1915 |
| 424,741 | Great Britain | 1935 |
| 486,490 | Great Britain | 1938 |
| 617,305 | Germany | 1935 |